United States Patent
Mantin et al.

(10) Patent No.: US 8,000,471 B2
(45) Date of Patent: Aug. 16, 2011

(54) ROBUST CIPHER DESIGN

(75) Inventors: Itsik Mantin, Shoham (IL); Aharon Grabovsky, Moshav Nerya (IL)

(73) Assignee: NDS Limited, Staines, Middlesex (GB)

( * ) Notice: Subject to any disclaimer, the term of this patent is extended or adjusted under 35 U.S.C. 154(b) by 448 days.

(21) Appl. No.: 12/223,137

(22) PCT Filed: Mar. 20, 2007

(86) PCT No.: PCT/IL2007/000364
§ 371 (c)(1),
(2), (4) Date: Aug. 14, 2008

(87) PCT Pub. No.: WO2007/113796
PCT Pub. Date: Oct. 11, 2007

(65) Prior Publication Data
US 2009/0202070 A1    Aug. 13, 2009

(30) Foreign Application Priority Data
Apr. 4, 2006 (IL) .......................................... 174784

(51) Int. Cl.
*H04L 9/00* (2006.01)
(52) U.S. Cl. ................ 380/44; 380/28; 380/29; 380/30; 380/45; 380/46; 380/47
(58) Field of Classification Search .................... 380/29, 380/44
See application file for complete search history.

(56) References Cited

U.S. PATENT DOCUMENTS
4,157,454 A * 6/1979 Becker ............................ 380/37
(Continued)

FOREIGN PATENT DOCUMENTS
GB     2345229 A * 12/1998
(Continued)

OTHER PUBLICATIONS
Mar. 28, 2008 Written Opinion of the International Searching Authority for captioned application.
Bruce Schneier, *Applied Cryptography: Protocols, Algorithms and Source Code in C* (2d ed. pp. 265-368) (John Wiley & Sons 1996).
(Continued)

*Primary Examiner* — Kambiz Zand
*Assistant Examiner* — Tongoc Tran
(74) *Attorney, Agent, or Firm* — Husch Blackwell LLP

(57) ABSTRACT

In an iterated block cipher, a method for round key encryption and key generation, the method including providing a first function Fi and a second function Fj, providing a round key generation function, the round key generation function being operative to utilize, in any given round, exactly one of the first function Fi, and the second function Fj, providing a round mixing function, the round mixing function being operative to utilize, in any given round, exactly one of the first function Fi, and the second function Fj, utilizing the round key generation function in at least a first round to generate a second round key for use in a second round, and utilizing the round mixing function in at least the first round to mix a first round key with a cipher state, wherein one of the following is performed in the first round the round key generation function utilizes the first function Fi to generate the second round key for use in the second round, substantially simultaneously with the round key mixing function utilizing the second function Fj to mix the first round key with the cipher state, and the round key generation function utilizes the second function Fj to generate the second round key for use in the second round, substantially simultaneously with the round key mixing function utilizing the first function Fi to mix the first round key with the cipher state. Related apparatus and methods are also described.

43 Claims, 9 Drawing Sheets

U.S. PATENT DOCUMENTS

| | | | |
|---|---|---|---|
| 4,543,646 A * | 9/1985 | Ambrosius et al. | 380/29 |
| 5,533,123 A * | 7/1996 | Force et al. | 713/189 |
| 6,028,939 A * | 2/2000 | Yin | 713/189 |
| 6,243,470 B1 * | 6/2001 | Coppersmith et al. | 380/259 |
| 7,639,797 B2 * | 12/2009 | Lee et al. | 380/28 |
| 2001/0386931 * | 11/2001 | Luyster | 380/37 |
| 2002/0118827 A1 * | 8/2002 | Luyster | 380/37 |
| 2003/0108195 A1 | 6/2003 | Okada et al. | |
| 2003/0198345 A1 * | 10/2003 | Van Buer | 380/43 |
| 2004/0047466 A1 | 3/2004 | Feldman et al. | |
| 2005/0135607 A1 * | 6/2005 | Lee et al. | 380/28 |
| 2006/0029223 A1 | 2/2006 | Ari | |

FOREIGN PATENT DOCUMENTS

| | | | |
|---|---|---|---|
| WO | WO 2007075154 | * | 7/2007 |

OTHER PUBLICATIONS

"Announcing The Advanced Encryption Standard (AES)" (Federal Information Processing Standards Publication 197, Nov. 26, 2001).

"Data Encryption Standard (DES)" (Federal Information Processing Standards Publication 46-3, Oct. 25, 1999).

Bruce Schneier, Applied Cryptography: Protocols, Algorithms and Source Code in C (2d ed. pp. 351-353, 1996).

* cited by examiner

ROBUST CIPHER DESIGN

RELATED APPLICATION INFORMATION

The present application is a 35 USC §371 application of PCT/IL2007/000364, filed on Mar. 30, 2007 and entitled "Robust Cipher Design", which was published in the English language with International Publication Number WO 2007/113796, and which claims the benefit of priority based on IL Patent Application serial number 174784, filed 4 Apr. 2006, entitled, "Robust Cipher Design".

FIELD OF THE INVENTION

The present invention relates to methods of encryption, and more particularly, to fault tolerant cipher design.

BACKGROUND OF THE INVENTION

Block ciphers are a well known family of symmetric key-based ciphers. Block ciphers operate on plain text in groups of bits. The groups of bits are referred to as blocks. Block ciphers are dealt with at length in Chapters 12-15 of *Applied Cryptography*, Second Edition, by Bruce Schneier, published by John Wiley and Sons, 1996. Many block ciphers are constructed by repeatedly applying a function. Such block ciphers are known as iterated block ciphers. An iteration of the block cipher is termed a round, and the repeated function is termed a round function. The number of times the round is repeated in an iterated block cipher is referred to as a round number (RN).

One block cipher, DES, is specified in FIPS 46-3, available on the Internet at: csrc.nist.gov/publications/fips/fips46-3/fips46-3.pdf. FIPS 46-3 is hereby incorporated herein by reference.

A second well known block cipher, AES, is specified in FIPS 197, available on the Internet at: csrc.nist.gov/publications/fips/fips197/fips-197.pdf. FIPS 197 is hereby incorporated herein by reference.

The disclosures of all references mentioned above and throughout the present specification, as well as the disclosures of all references mentioned in those references, are hereby incorporated herein by reference.

SUMMARY OF THE INVENTION

The present invention seeks to provide an improved method and system for cipher design.

There is thus provided in accordance with a preferred embodiment of the present invention providing a first function $F_i$ and a second function $F_j$, providing a round key generation function, the round key generation function being operative to utilize, in any given round, exactly one of the first function $F_i$ and the second function $F_j$, providing a round mixing function, the round mixing function being operative to utilize, in any given round, exactly one of the first function $F_i$ and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_i$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
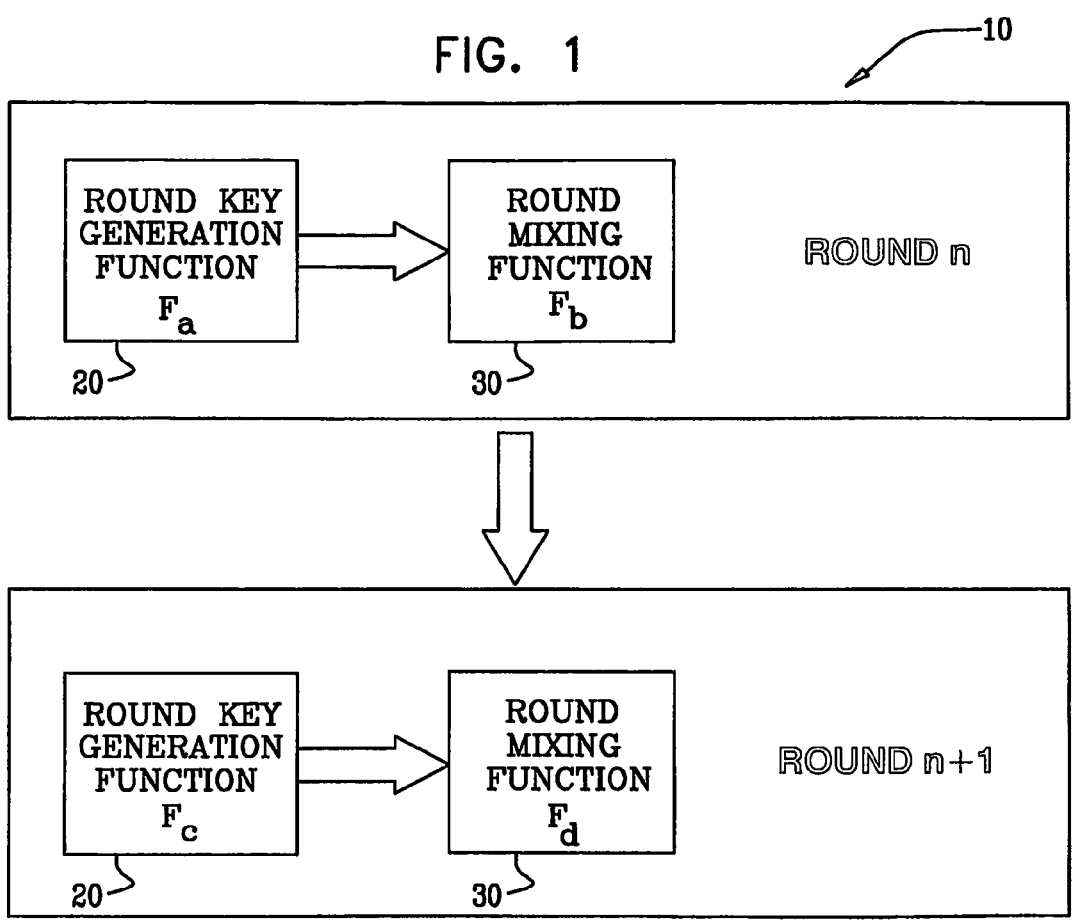
FIG. 1 is a simplified block diagram illustration of a system for robust cipher design constructed and operative in accordance with a preferred embodiment of the present invention.

Reference is now made to FIG. 1, which is a simplified block diagram illustration of a system 10 for robust cipher design constructed and operative in accordance with a preferred embodiment of the present invention. The system 10 of FIG. 1 comprises different instances of a function F, depicted in round n as $F_a$ and $F_b$. In round n+1, the different instances of function F are depicted as $F_c$ and $F_d$.

The function F, in preferred embodiments thereof, preferably comprises at least one of:

a significant portion of cipher security (that is to say that if F is poorly selected, a cipher comprising F may be insecure); and a significant portion of hardware complexity of a typical hardware implementation of the cipher comprising F (the inventors of the present invention anticipate that at least 10% and preferably 20% of the gates in the hardware implementation of the cipher comprising F are dedicated to the function F, or at least 10% and preferably 20% of the voltage of the hardware implementation of the cipher comprising F is dedicated to the function F).

In preferred embodiments of a cipher comprising the function F, the function F, therefore, preferably comprises a significant portion of cipher security and comprises a significant portion of the hardware implementation of the cipher.

For example and without limiting the generality of the foregoing, the function F may preferably comprise a layer of S-boxes (well known cryptographic structures), such as the AES invertible 8-bit-to-8-bit S-boxes, or DES non-invertible 6-bit-to-4-bit S-boxes. Alternatively, the function F may comprise a linear transformation such as the AES ShiftRows transformation function, or the AES MixColumns transformation function.

Preferred methods of implementation of the present invention are discussed below with reference to FIGS. 4-9.

The system of FIG. 1 also comprises a round key generation function 20, depicted in round n as comprising the first function, $F_a$, and later depicted in round n+1 as comprising the second function, $F_c$. The system of FIG. 1 also comprises a round mixing function 30, depicted in round n as comprising a third function, $F_b$, and later depicted in round n+1 as comprising a fourth function, $F_d$. $F_a$, $F_b$, $F_c$, and $F_d$ are preferably selected from among two functions, $F_i$ and $F_j$, thereby allowing implementation of only the two functions, $F_i$ and $F_j$ for the four functions, $F_a$, $F_b$, $F_c$, and $F_d$. In some preferred embodiment of the present invention, $F_b$ and $F_c$ are not identical, and thus can preferably be executed substantially simultaneously. That is, either $F_b=F_i$ and $F_c=F_j$, or $F_b=F_j$ and $F_c=F_i$. In any event, the functions $F_a$ and $F_d$ can be either of functions $F_i$ or $F_j$.

Figure 2:
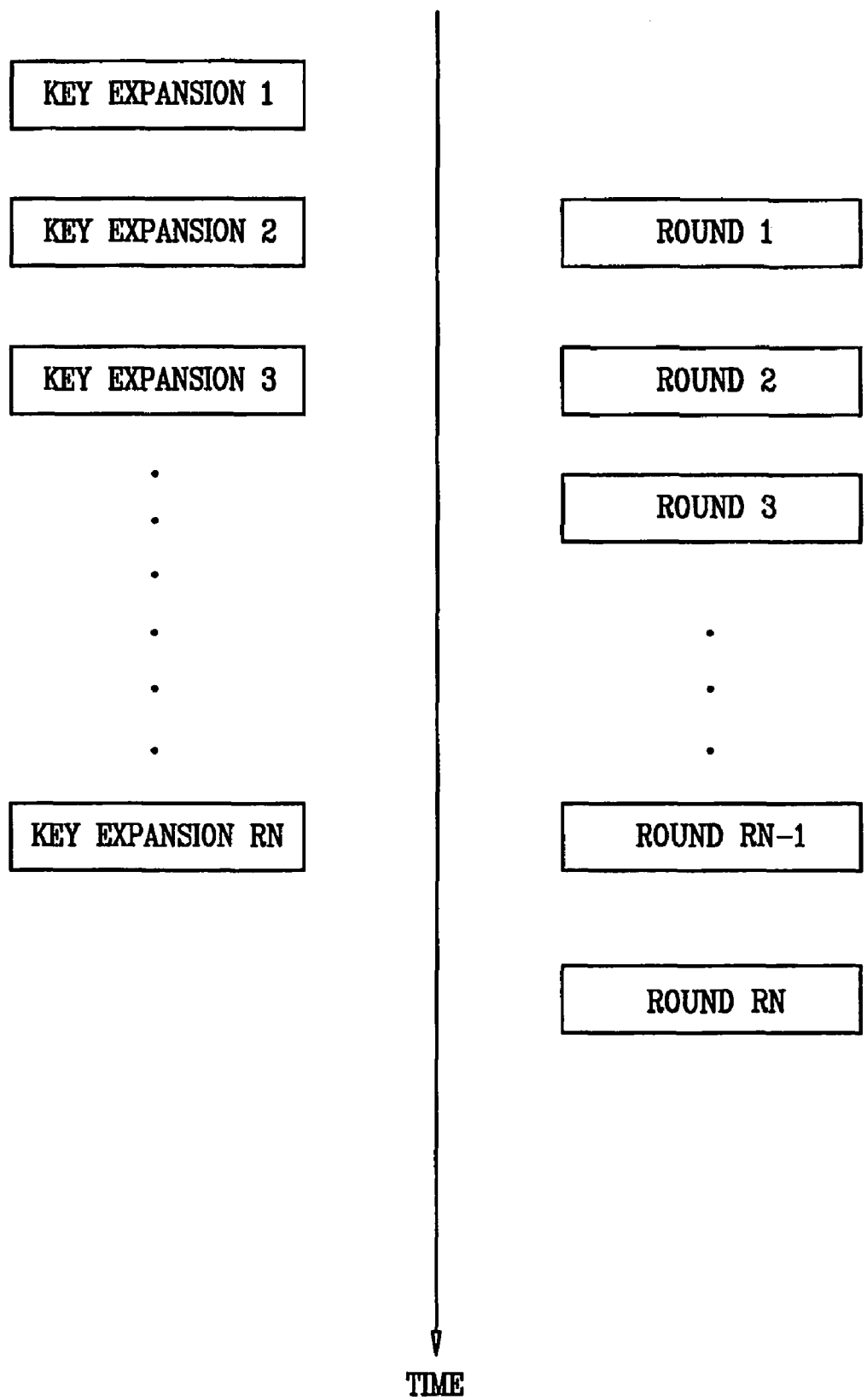
FIG. 2 is a time line showing one preferred implementation of the relationship between key expansion and encryption rounds in a cipher designed according to the method of FIG. 1.

The operation of the system of FIG. 1 is now briefly described, making additional reference to FIG. 2, which is a time line showing one preferred implementation of the relationship between key expansion (note that the terms "key expansion" and "key generation" are used interchangeably in the present disclosure and figures) and encryption rounds in a cipher designed according to the method of FIG. 1. Prior to round 1, the round key generation function 20 produces a round key for use by the round mixing function 30 in round 1. Substantially in parallel to the operation of the round mixing function 30 in round 1, the round key generation function 20 produces a round key for use by the round mixing function 30 in round 2. The process of the round key generation function 20 producing a round key for use by the round mixing function 30 in the next round continues substantially in parallel to the operation of the round mixing function 30 until in round rounds number–1 (RN–1), the round key generation function 20 produces a round key for use by the round mixing function 30 in round RN. During round RN, there is no next round, and thus, while the round mixing function 30 operates using the round key produced by the round key generation function 20 during round RN–1, the round key generation function 20 preferably does not generate a key.

The different instances of F, $F_a$ and $F_b$, are preferably implemented only once, preferably in hardware. It is appreciated that $F_a$ and $F_b$ may, under some circumstances, also be implemented in software.

Those skilled in the art will appreciate that implementing: the functions $F_a$ and $F_b$ in hardware, instead of implementing a single function in hardware, requires additional gates in . . . are, and additional voltage in order to power the gates. In order to more efficiently implement the two instances of F, when $F_a$ is operating as part of round mixing function 30, $F_b$ preferably is operating as part of the round key generation function 20 for the next round. Similarly, when $F_b$ is operating as part of round mixing function 30, $F_a$ preferably is operating as part of the round key generation function 20 (FIG. 1) for the next round.

Figure 3A:
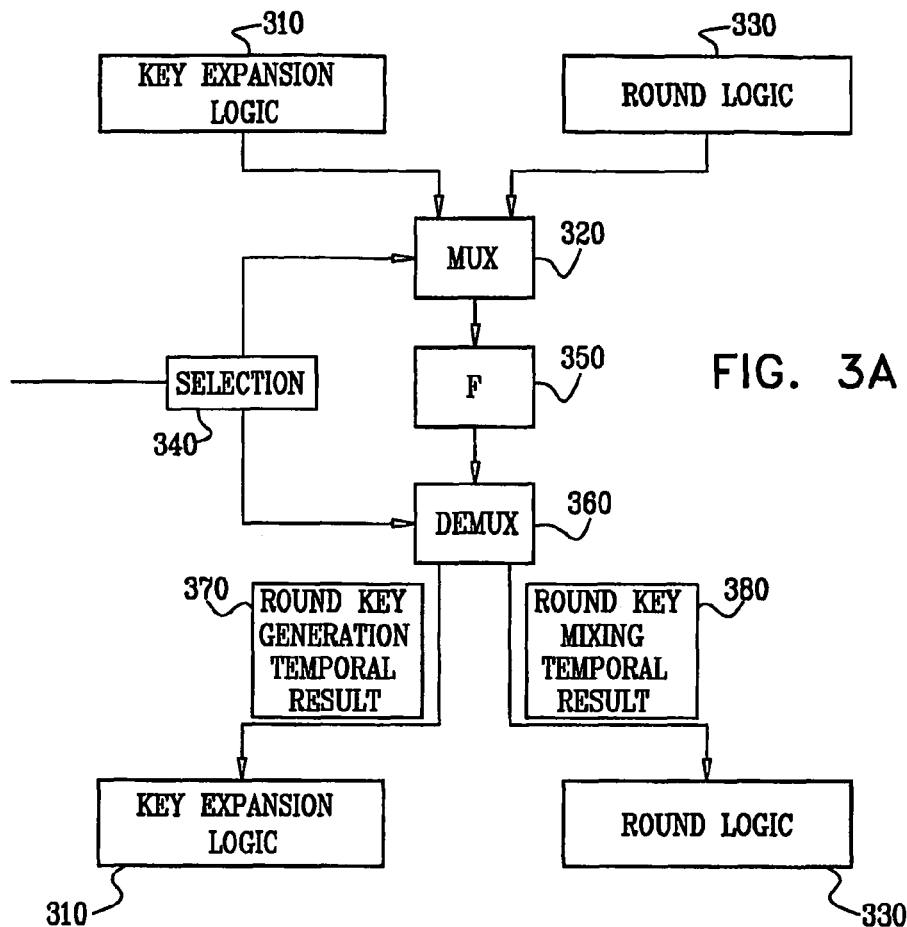
FIG. 3A is a simplified block diagram illustration depicting the use of MUX and DEMUX modules in a preferred implementation of the method of FIG. 1.

Reference is now made to FIG. 3A, which is a simplified block diagram illustration depicting the use of MUX and DEMUX modules in a preferred implementation of the method of FIG. 1. In a preferred implementation of the present invention, a MUX module and a DEMUX module are preferably operative to differentiate between different sources for input, a key expansion input or an input as part of the round, as well as the different outputs, a register for round keys or a round key state register. The MUX modules are preferably updated by a counter (not depicted) which is operative to count rounds.

Hardware comprising key expansion logic 310 outputs a temporal result to a first MUX module 320. Similarly, hardware comprising round encryption logic 330 outputs a temporal result to the first MUX module 320. The first MUX module 320, based on selection criteria 340, determines if the output of the MUX module 320 has to be a value taken as MUX input from the key expansion logic 310 hardware or the value taken as MUX input from the round encryption logic 330 hardware. A preferred implementation, given by way of example, relevant for the discussion below of FIGS. 8 and 9, of the selection criteria 340 comprises a counter ranging in value from 0 to 3. If the counter value is 0 or 1, one option is implemented by the MUX module. If the counter value is 2 or 3, the second option is implemented by the MUX module. Output from the MUX module 320 is preferably sent to $F_i$ as appropriate for a particular round. Output from $F_i$ is preferably input into a DEMUX module 360. The DEMUX module 360 preferably applies the selection criteria 340 to determine if the received input needs to be preferably output as a round key generation temporal result 370 to the key expansion logic 310 hardware or as a round key mixing temporal result 380 to the round encryption logic 330 hardware.

In some preferred embodiments of the present invention, key expansion logic 310 has a MUX component (not depicted) which selects between the round key generation temporal result 370 of $F_i$ and the round key mixing temporal result 380 of $F_j$. Similarly, in such preferred embodiments, the round encryption logic 330 has a MUX component (not depicted) which selects between the round key generation temporal result 370 of $F_j$ and the round key mixing temporal result 380 of $F_i$.

A design similar to the system of FIG. 3A comprises a preferred embodiment of MUX and DEMUX selection logic for $F_j$, where the selection criteria 340 that is used for $F_j$ is preferably the negation of the selection logic that is used for $F_i$. That is, when the function $F_i$ is used for round key generation, function $F_j$ is preferably used for round key mixing, and vice-versa.

Those skilled in the art will appreciate that in addition to the benefit of added efficient use of voltage, a cipher designed as described herein also has additional security in that if, for instance, $F_j$ is found to be weak (for example and without limiting the generality of the foregoing, $F_j$ comprises linear properties; or $F_j$ comprises differential properties), $F_i$ still preferably gives some measure of protection to the cipher.

In some preferred embodiment of the present invention, the function F is deliberately designed to be inefficient in any implementation, except for an implementation comprising specialized hardware, thereby making a cipher comprising the function F inefficient in any implementation, except for an implementation comprising specialized hardware. Therefore, a cipher designed so as to comprise such an embodiment of the function F in $F_i$ and in $F_j$, $F_i$ being is inefficient, except for an implementation comprising specialized hardware, and $F_j$ not being inefficient in an implementation not comprising specialized hardware, comprises an implementation of the cipher which is still, substantially inefficient except for an implementation comprising specialized hardware.

In order to differentiate between multiple usages of $F_i$ (in the round mixing function 30 (FIG. 1) and in the round key generation function 20 (FIG. 1)), constant round vectors may preferably be used in order to affect the behavior of function $F_i$. Similarly, in order to differentiate between multiple usages of $F_j$ (in the round mixing function 30 (FIG. 1) and in the round key generation function 20 (FIG. 1)), constant round vectors may preferably be used in order to affect the behavior of function $F_j$. Constant round vectors may preferably be used for at least one of two purposes:

1. allowing more versions of F than are implemented in hardware (for instance, implement $F_i$ and $F_j$, and use different constant vectors during different rounds in order to increase differences in outputs of different rounds); and 2. differentiating between usage of either $F_i$ or $F_j$ as a round operation and using $F_i$ and $F_j$ as a key expansion operation by using a different constant round vector during key expansion than during the round operation.

Figure 3B:
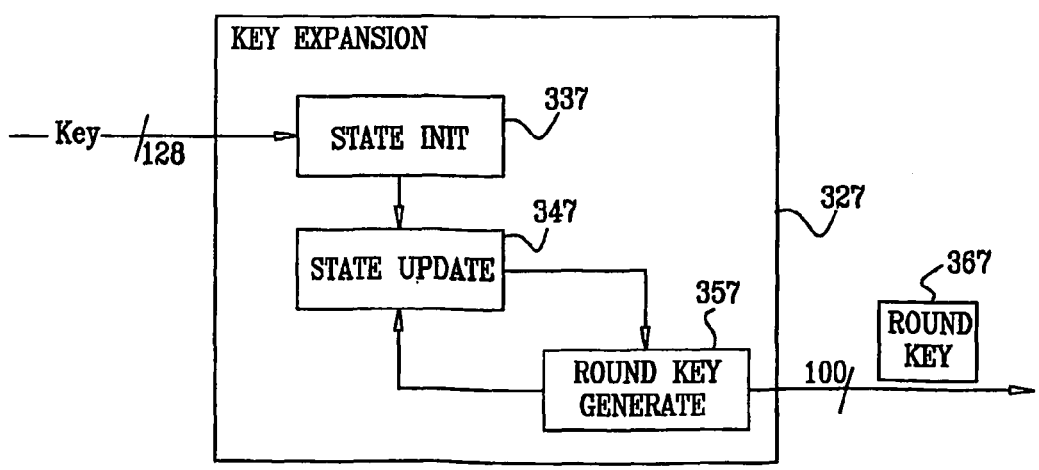
FIG. 3B is a simplified block diagram illustration of a preferred implementation of a round key generation function operative to generate round keys in a cipher designed according to the method of FIG. 1.

The use of functions $F_i$ and $F_j$ as part of the round key generation function and as part of the round mixing function in cipher design is now discussed. Reference is now made to FIG. 3B, which is a simplified block diagram illustration of a preferred implementation of a round key generation function operative to generate round keys in a cipher designed according to the method of FIG. 1. $F_i$ and $F_j$ may comprise either invertible functions or non-invertible functions, as appropriate, depending on the cipher in which functions $F_i$ and $F_j$ are implemented, and on the stage of implementing the cipher in which functions $F_i$ and $F_j$ are implemented. As will be discussed below with reference to FIGS. 4, 6, and 8, in Feistel based encryption schemes, such as DES, $F_i$ and $F_j$ (as part of the key mixing mechanism) preferably comprise a part of the combination of the round key with "right" half, prior to combining (XORing in DES) with the "left" half (a non-invertible operation). In such a cipher, functions $F_i$ and $F_j$ are preferably implemented as non-invertible functions. Alternatively and preferably, as described below with reference to FIGS. 5, 7, and 9, in substitution permutation ciphers such as the AES cipher (FIPS 197), $F_i$ and $F_j$ preferably comprise part of the round function. In such a cipher, functions $F_i$ and $F_j$ are preferably implemented as invertible functions.

The round key generation function 327 operates iteratively in order to generate a plurality of keys. The iterative operation of round key generation function 327 comprises a state, R. The state R is initialized by executing a function, StateInit 337, with root key K as input during every round. R is updated by a State Update function 347. The State Update function 347 is applied to the state from the previous round in order to update R for the round. A Round Key Generate function 357 generates a new round key $RK_i$ 367 from the updated value of R. Thus, round keys $RK_1$ through $RK_{RN}$ (RN=round number, the number of rounds, as described above) are generated from root key K according to the following method:

$R_0$ = InitState(K)
For i = 1 to RN
    $R_i$ = StateUpdate($R_{i-1}$)
    $RK_i$ = RoundKeyGenerate($R_i$)

In preferred embodiments of the present invention, the size of the state R is preferably equal to the size of the key. For example and without limiting the generality of the foregoing, if the key is 128 bits, the state R is preferably 128 bits.

One preferred method of determining the state during the iterative process described above, applicable when RN is less than the size of the key in bits, comprises initializing an L-bit state with an L-bit key K, and circularly shifting the L bit key one bit each round. In such a method of determining the state, RoundKeyGenerate 357 need not be an invertible function.

In preferred implementations where $F_i$ and $F_j$ comprise non-invertible functions, and the round key generation function is designed as described above, non-invertible function F preferably comprises a portion of the RoundKeyGenerate 357 function. In preferred implementations where $F_i$ and $F_j$ comprise invertible functions, and the round key generation function is designed as described above, the StateUpdate 347 function is preferably invertible, and invertible function F preferably comprises a portion of the StateUpdate 347 function.

Non-limiting examples of different preferred implementations of the present invention are now described.

Figure 4:
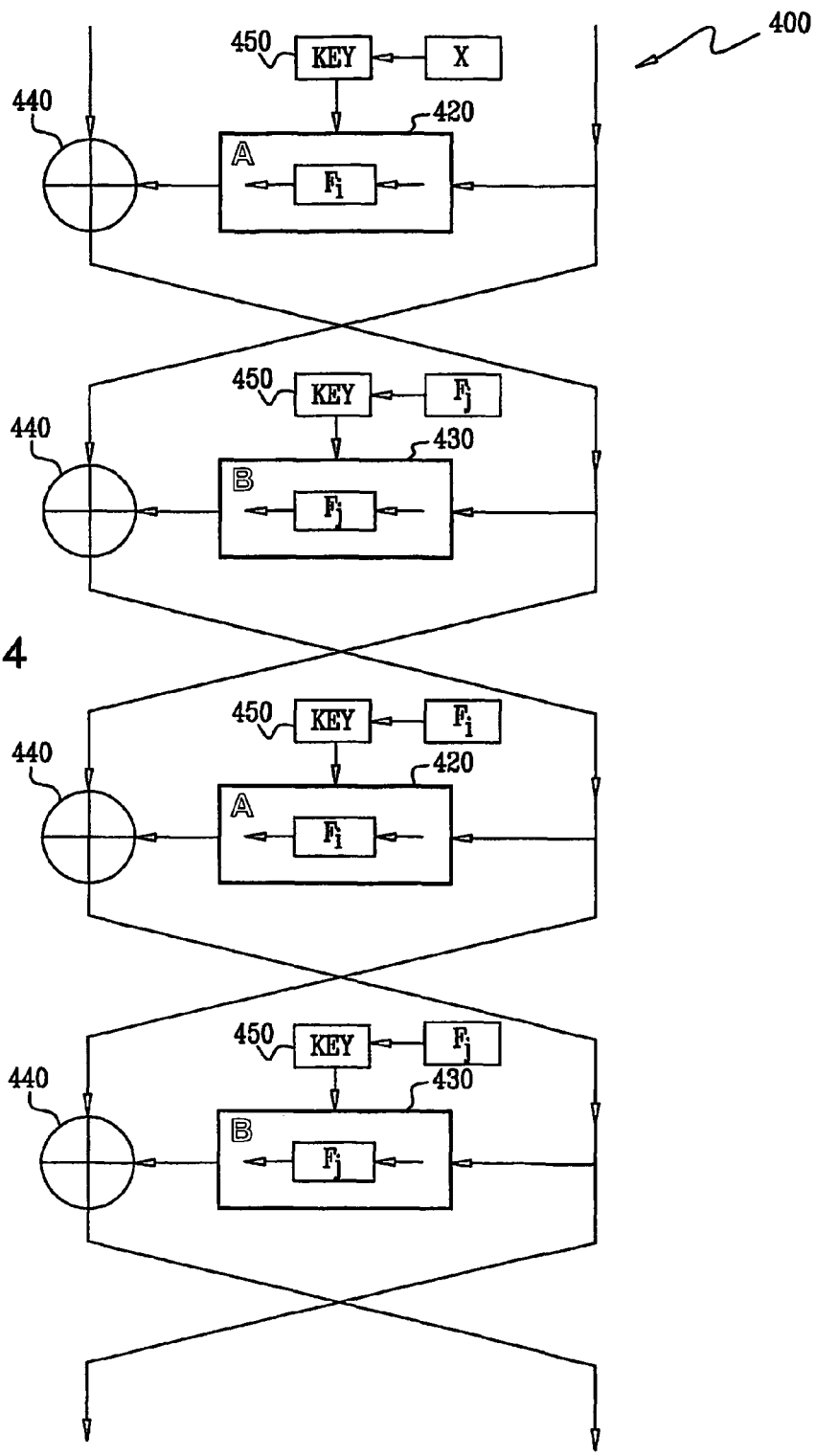
FIG. 4 is a simplified block diagram illustration of four rounds of a typical Feistel block cipher constructed and operative in accordance with the system of FIG. 1.

Reference is now made to FIG. 4, which is a simplified block diagram illustration of four rounds of a typical Feistel block cipher 400 constructed and operative in accordance with the system of FIG. 1. It is appreciated that FIG. 4 provides an illustration of data structures and methods for implementing an encryption network, the illustration being drawn in a format which is well known in the art.

The Feistel block cipher 400 comprises round mixing function designated hereinafter as function A 420 and function B 430. Additionally, a combine function 440, depicted in FIG. 1 as ⊕, XOR (exclusive OR), combines the output of either of function A 420 or of function B 430 with an input. Even though the combine function 440 is depicted as XOR, it is appreciated that any appropriate combining function may be implemented to combine the output of either of function A 420 or of function B 430 with the input.

The operation of the system of FIG. 4 is now described. As is well known in the art, block ciphers typically are applied in an iterative fashion, an iteration of the cipher being referred to as a "round". A function which is repeated during each round is typically referred to as a "round function". Frequently, the round function comprises several sub-functions.

For example and without limiting the generality of the foregoing, the well known in the art DES block cipher (a Feistel cipher) round function comprises four stages, each stage executed in an appropriate sub-function:

1. Expansion, in which a 32-bit input block is expanded to 48 bits;

2. Key mixing, in which a 48-bit output of the expansion is combined, using a XOR function, with a round key 450, the round key 450 being specific to a specific round;

3. Substitution, in which an output of the key mixing function is subdivided into 8 6-bit sub-blocks. Each of the 8 6-bit sub-blocks is input into a substitution box ("S-box"), which, according to a non-linear transformation, outputs a 4-bit block, thereby producing a total of 32 output bits; and 4. Permutation, in which the 32 output bits of the substitution are rearranged according to a fixed permutation, the "P-box".

In certain preferred embodiments of the present invention, a function, F, operative as a sub-function comprised in the round function of the block cipher 410 is replaced with different instances of F: $F_i$ and $F_j$. During different rounds of the block cipher 410, the different instances of F ($F_i$ and $F_j$), are used. Thus, in the preferred embodiment of the present invention depicted in FIG. 4, function A 420, comprising function $F_i$, and function B 430, comprising function $F_j$, are used in alternate rounds.

Since the round encryption function preferably uses a round key generated during a previous round, it is appreciated that during rounds when function A 420, comprising function $F_i$, comprises the round mixing function, $F_j$ is preferably used in the round key generation function to generate the round key for the next round. During rounds when function B 430, comprising function $F_j$, comprises the round mixing function, $F_i$ is preferably used in the round key generation function to generate the round key for the next round.

In the cipher depicted in FIG. 4, each sequence of rounds comprises ABAB..., such that each round alternates the use of the implementation of F ($F_i$, $F_j$, $F_i$, $F_j$, ...). In such a preferred implementation, key expansion preferably comprises XBABA..., where a first round uses a key, X, that can be derived either from A or B. Thus, the following table describes the preferred implementation depicted in FIG. 4:

| Round | Key Generation | Round Function |
|---|---|---|
| 1 | X | $F_i$ |
| 2 | $F_j$ | $F_j$ |
| 3 | $F_i$ | $F_i$ |
| 4 | $F_j$ | $F_j$ |
| 5 | $F_i$ | $F_i$ |

Figure 5:
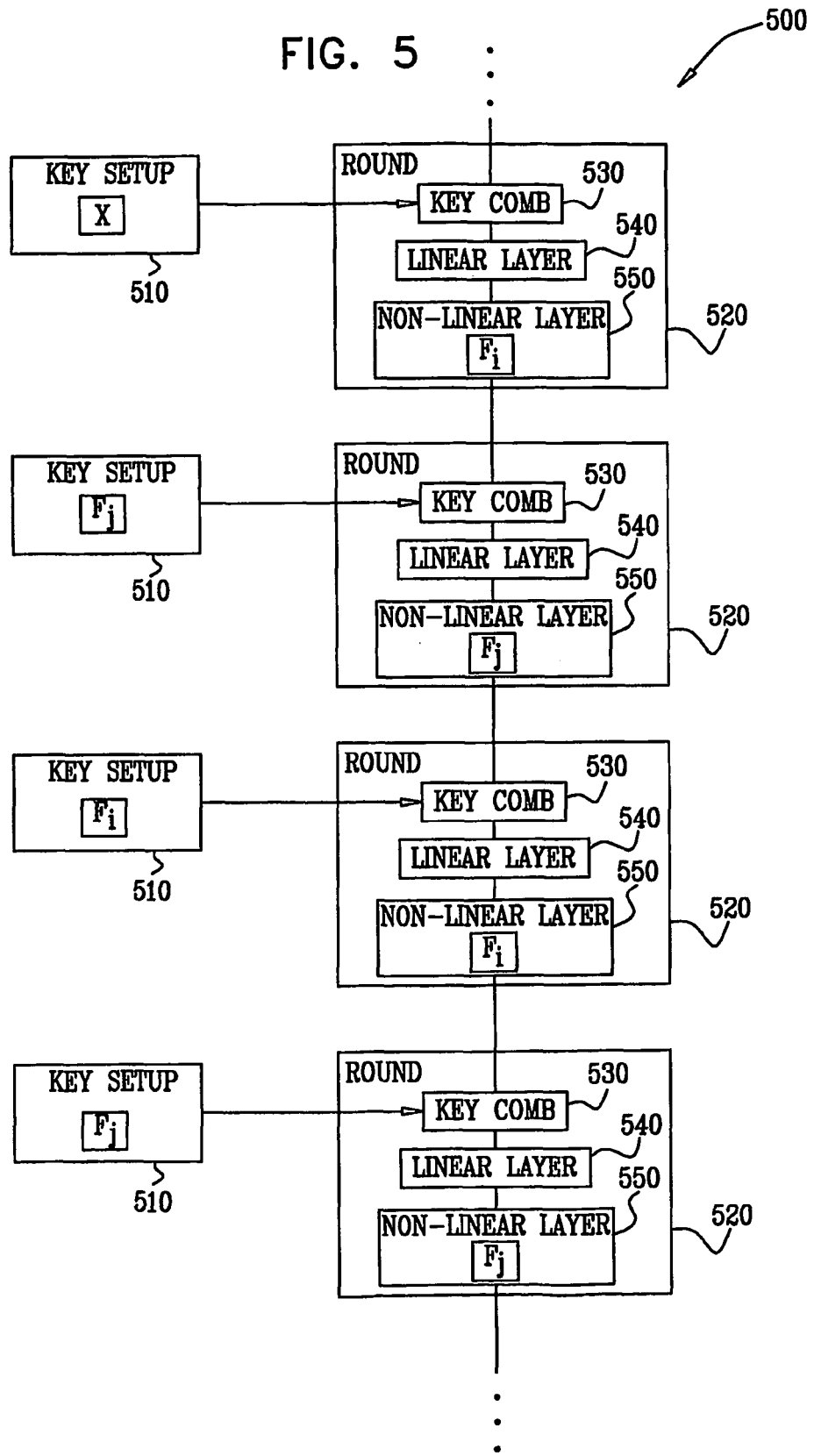
FIG. 5 is a simplified block diagram illustration of four rounds of a typical AES-like block cipher constructed and operative in accordance with the system of FIG. 1.

Reference is now made to FIG. 5, which is a simplified block diagram illustration of four rounds of a typical AES-like block cipher 500 constructed and operative in accordance with the system of FIG. 1. Each round of the AES-like block cipher comprises a round key generation function 510 (for ease of depiction, "key setup", in FIG. 5) operative to provide the round key to the round mechanism 520. Each round mechanism 520 typically comprises a key mixing function 530 (for ease of depiction, "key comb", in FIG. 5), which is operative to receive the key from the round key generation function 510, and combine, typically using a XOR function, the key with a known constant. Output from the key mixing function 530 is typically input into a linear layer 540. The linear layer 540 typically comprises functions well known in the art, such as "MixRows" and "ShiftColumns". Output from the linear layer 540 is typically input into a non-linear layer 550. The non-linear layer 550 typically comprises S-boxes. Additionally, in preferred embodiments of the present invention, the non-linear layer 550 comprises an implementation of the function F, either $F_i$ or $F_j$. In the preferred implementation of the present invention depicted in FIG. 5, implementations of $F_i$ or $F_j$ alternate, similar to the preferred implementation depicted in FIG. 4.

Figure 6:
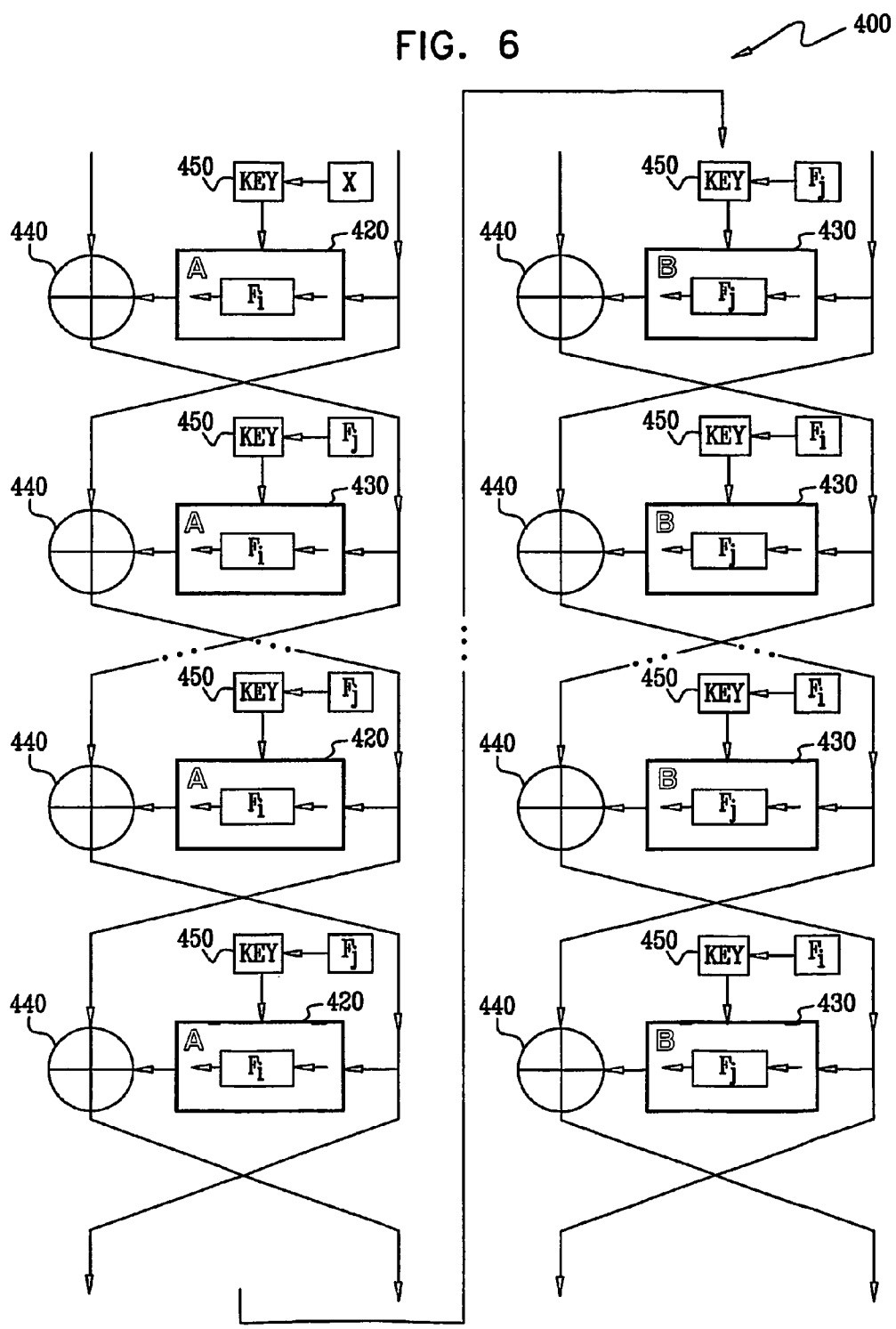
FIG. 6 is a simplified block diagram illustration of eight rounds of a typical Feistel block cipher constructed and operative in accordance with an alternative preferred embodiment of the system of FIG. 1.
Figure 7:
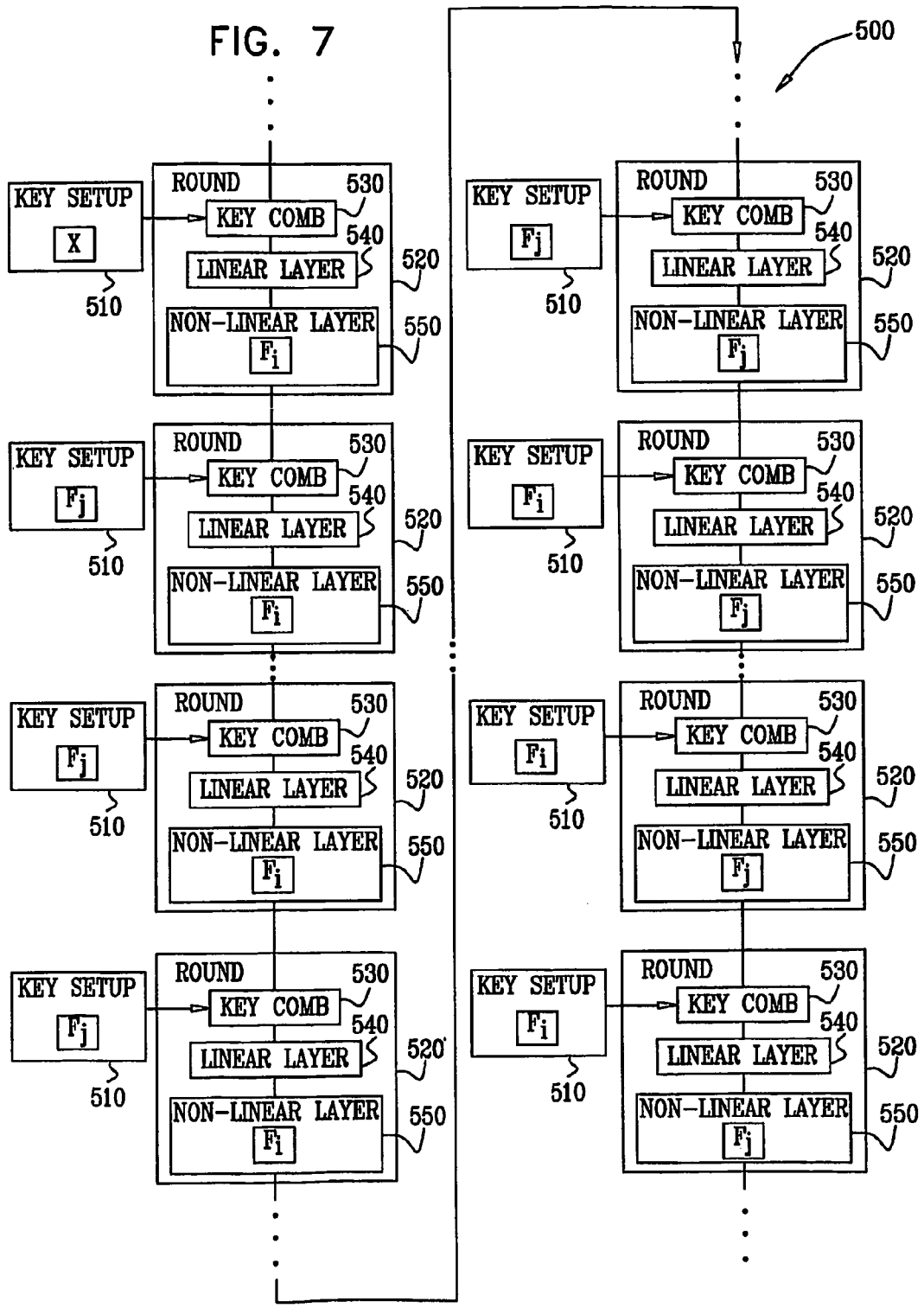
FIG. 7 is a simplified block diagram illustration of eight rounds of a typical AES-like block cipher constructed and operative in accordance with an alternative preferred embodiment of the system of FIG. 1.

Reference is now made to FIG. 6, which is a simplified block diagram illustration of eight rounds of a typical Feistel block cipher constructed and operative in accordance with an alternative preferred embodiment of the system of FIG. 1. Reference is additionally made to FIG. 7, which is a simplified block diagram illustration of eight rounds of a typical AES-like block cipher constructed and operative in accordance with an alternative preferred embodiment of the system of FIG. 1.

The operation of the systems depicted in FIG. 6 is described above with reference to FIG. 4, and the operation of the systems depicted in FIG. 7 is described above with reference to FIG. 5.

In the ciphers depicted in FIGS. 6 and 7, each sequence of several rounds first comprises function $F_i$ in the round mixing function and comprises the function $F_j$ in the round key generation function. Then, after the sequence of several rounds, functions $F_i$ and $F_j$ switch roles, and function $F_i$ is comprised in the round key generation function, and function $F_j$ is comprised in the round mixing function. Thus, the following table describes the preferred implementation depicted in FIGS. 6 and 7:

| Round | Key Generation | Round Function |
|---|---|---|
| 1 | X | $F_i$ |
| 2 | $F_j$ | $F_i$ |
| ... | $F_j$ | $F_i$ |
| n | $F_j$ | $F_i$ |
| n + 1 | $F_j$ | $F_i$ |
| n + 2 | $F_j$ | $F_j$ |
| n + 3 | $F_i$ | $F_j$ |
| ... | $F_i$ | $F_j$ |
| n + m | $F_i$ | $F_j$ |
| n + m + 1 | $F_i$ | $F_j$ |
| n + m + 2 | $F_i$ | $F_j$ |

Figure 8:
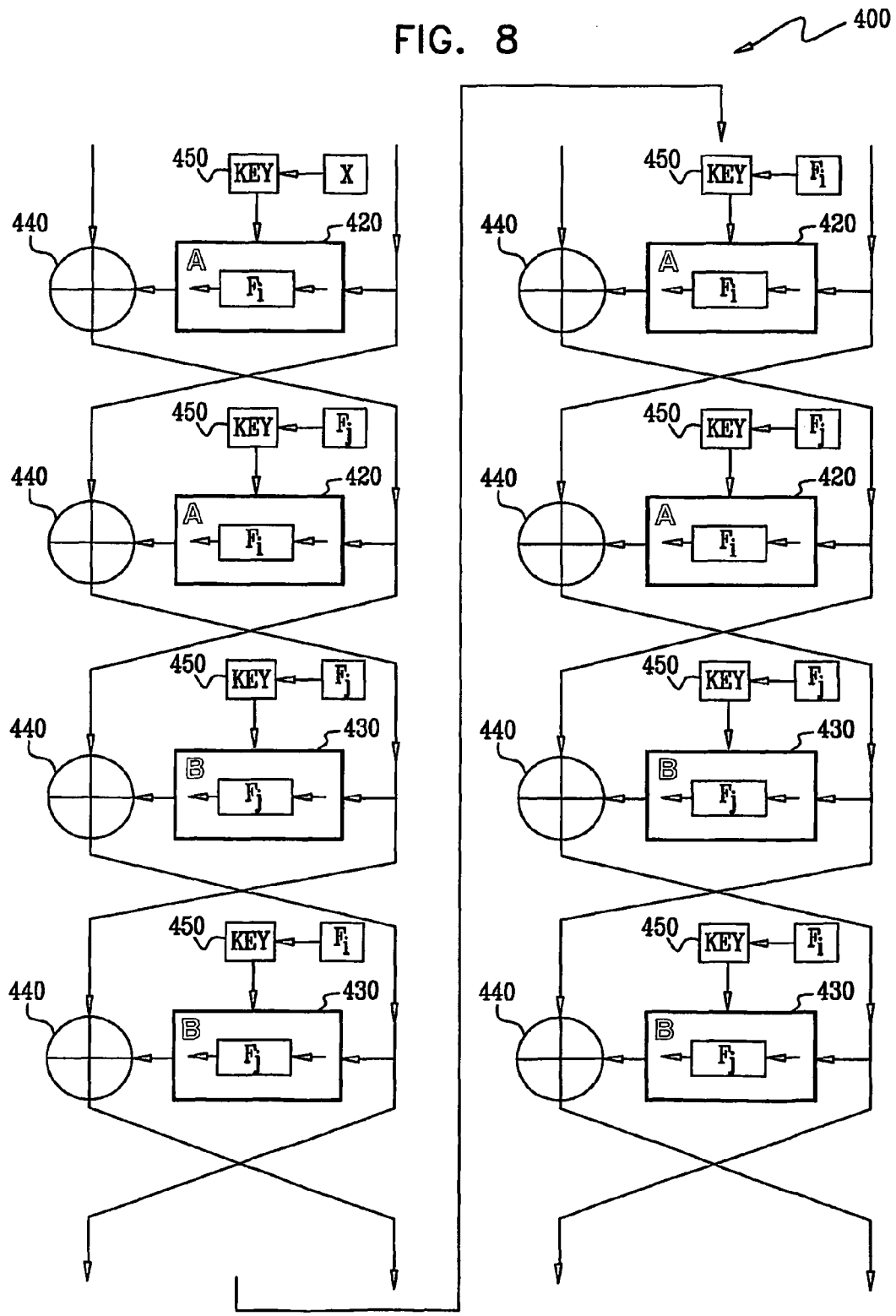
FIG. 8 is a simplified block diagram illustration of eight rounds of a typical Feistel block cipher constructed and operative in accordance with yet another alternative preferred embodiment of the system of FIG. 1.
Figure 9:
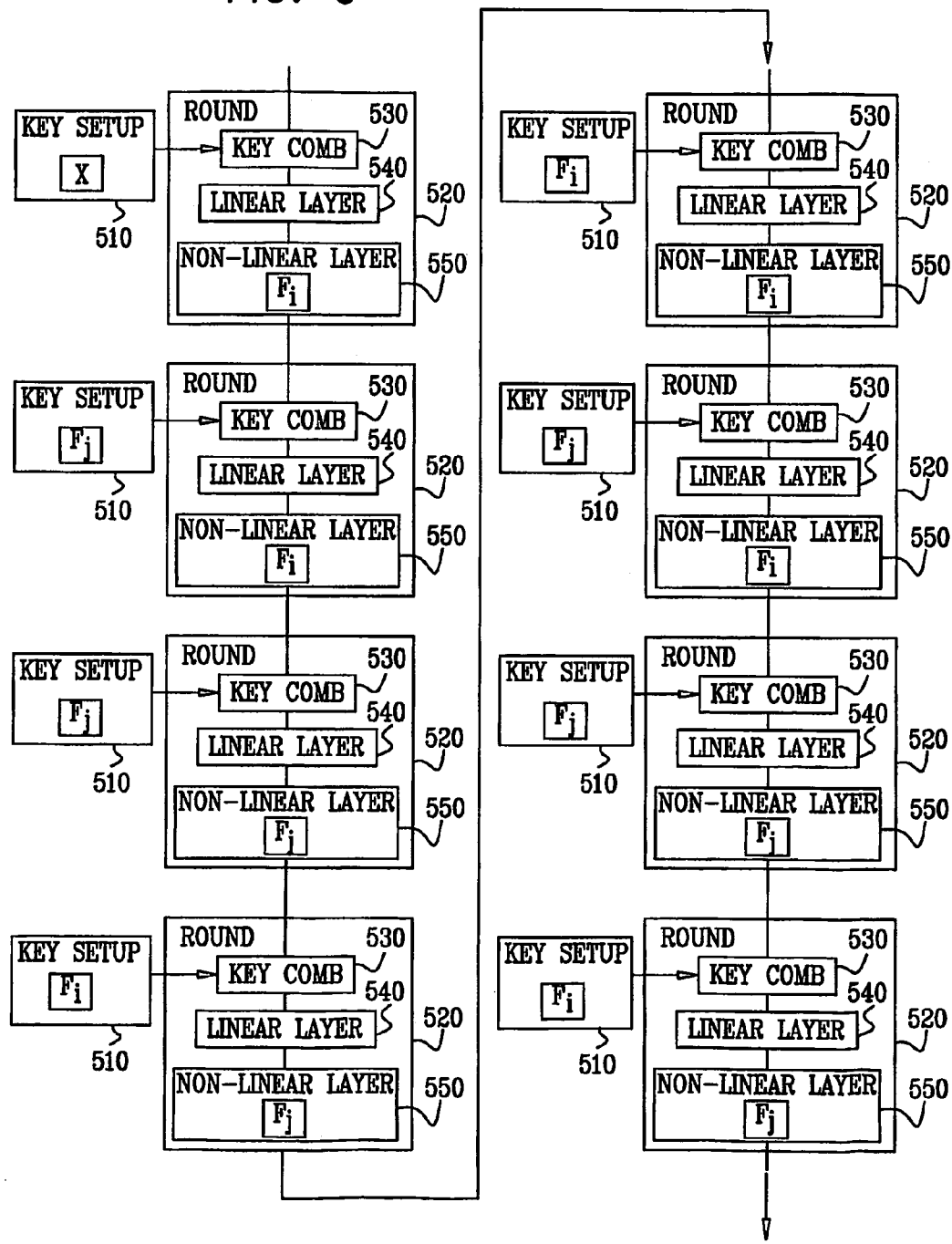
FIG. 9 is a simplified block diagram illustration of eight rounds of a typical AES-like block cipher constructed and operative in accordance with yet another alternative preferred embodiment of the system of FIG. 1.

Reference is now made to FIG. 8, which is a simplified block diagram illustration of eight rounds of a typical Feistel block cipher constructed and operative in accordance with yet another alternative preferred embodiment of the system of FIG. 1. Reference is additionally made to FIG. 9, which is simplified block diagram illustration of eight rounds of a typical AES-like block cipher constructed and operative in accordance with yet another alternative preferred embodiment of the system of FIG. 1.

The operation of the systems depicted in FIG. 8 is described above with reference to FIG. 4, and the operation of the systems depicted in FIG. 9 is described above with reference to FIG. 5.

In the ciphers depicted in FIGS. 8 and 9, two rounds comprise function $F_i$ in the round key generation function and comprise the function $F_j$ in the round mixing function. Then, after the two rounds, functions $F_i$ and $F_j$ switch roles, and for the next two rounds, function $F_i$ is comprised in the round key generation function; and function $F_j$ is comprised in the round mixing function. Thus, the following table describes the preferred implementation depicted in FIGS. 8 and 9:

| Round | Key Generation | Round Key |
|---|---|---|
| 1 | X | $F_i$ |
| 2 | $F_j$ | $F_i$ |
| 3 | $F_j$ | $F_j$ |
| 4 | $F_i$ | $F_j$ |
| 5 | $F_i$ | $F_i$ |

It is appreciated that input into the ciphers and rounds therein described above may comprise preprocessing. Furthermore, output of the ciphers and rounds therein may comprise postprocessing.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. In an iterated block cipher, a method for round key encryption and key generation, the method comprising:
providing a first function $F_i$ and a second function $F_j$;
providing hardware implementation of the first function $F_i$ and hardware implementation of the second function $F_j$;
providing a round key generation function, the round key generation function being operative to utilize, in any given round, exactly one of:
the first function $F_i$; and
the second function $F_j$;
providing a round mixing function, the round mixing function being operative to utilize, in any given round, exactly one of:
the first function $F_i$; and
the second function $F_j$;
providing an implementation of the round key generation function, the implementation of the round key generation function being operative to utilize, in any given round, exactly one of:
the hardware implementation of the first function $F_i$; and
the hardware implementation of the second function $F_j$;
providing an implementation of the round mixing function, the implementation of the round mixing function being operative to utilize, in any given round, exactly one of:
the hardware implementation of the first function $F_i$; and
the hardware implementation of the second function $F_j$;
utilizing the implementation of the round key generation function in at least a first round to generate a second round key for use in a second round;
utilizing the implementation of the round mixing function in at least the first round to mix a first round key with a cipher state;
outputting a temporal result of the round key generation function; and
outputting a temporal result of the round mixing function, wherein one of the following is performed in the first round:
the implementation of the round key generation function utilizes the hardware implementation of the first function $F_i$ to generate the second round key for use in the second round, substantially simultaneously with the implementation of the round key mixing function utilizing the hardware implementation of the second function $F_j$ to mix the first round key with the cipher state; and
the implementation of the round key generation function utilizes the hardware implementation of the second function $F_j$ to generate the second round key for use in the second round, substantially simultaneously with the implementation of the round key mixing function utilizing the hardware implementation of the first function $F_i$ to mix the first round key with the cipher state.

2. The method according to claim 1, and wherein a first input comprising the temporal result of the round key generation function and a second input comprising the temporal result of the round mixing function are received at a MUX module, one of the first input and the second input comprising only an input to the first function $F_i$.

3. The method according to claim 2 and also comprising differentiating between taking the temporal result of the round key generation function as an input and the first function $F_i$ taking the temporal result of the round mixing function as an input based on a selection criterion.

4. The method according to claim 3 and wherein the selection criterion comprises making a decision based upon a value of a counter.

5. The method according to claim 4 and wherein the counter is a counter of the round.

6. The method according to claim 1, and wherein a first input comprising the temporal result of the round key generation function and a second input comprising the temporal result of the round mixing function are received at a MUX module, one of the first input and the second input comprising only an input to the second function $_j$.

7. The method according to claim 6 and also comprising differentiating between taking the temporal result of the round key generation function as an input and the second function $F_j$ taking the temporal result of the round mixing function as an input based on a selection criterion.

8. The method according to claim 7 and wherein the selection criterion comprises making a decision based upon a value of a counter.

9. The method according to claim 8 and wherein the counter is a counter of the round.

10. The method according to claim 1, and wherein an output comprising the result of the first function $F_i$ is received at a DEMUX module;
the output received at the DEMUX module is input, as a temporal result, to one of:
the implementation of the round key generation function, thereby enabling completion of round key generation; and
the implementation of the round mixing function, thereby enabling completion of the round mixing.

11. The method according to claim 10 and also comprising differentiating between the input to the round key generation module and the input to the round mixing module based on a selection criterion.

12. The method according to claim 11 and wherein the selection criterion comprises making a decision based upon a value of a counter.

13. The method according to claim 12 and wherein the counter is a counter of the round.

14. The method according to claim 1, and wherein an output comprising the result of the second function $F_j$ is received at a DEMUX module;
the output received at the DEMUX module is input, as a temporal result, to one of:
the implementation of the round key generation function, thereby enabling completion of round key generation; and
the implementation of the round mixing function, thereby enabling completion of the round mixing.

15. The method according to claim 14 and also comprising differentiating between the input to the round key generation module and the input to the round mixing module based on a selection criterion.

16. The method according to claim 15 and wherein the selection criterion comprises making a decision based upon a value of a counter.

17. The method according to claim 16 and wherein the counter is a counter of the round.

18. The method according to claim 1 and also comprising inputting different constant vectors to the hardware implementation of the first function $F_i$ during different rounds of operation.

19. The method according to claim 1 and also comprising inputting different constant vectors to the hardware implementation of the second function $F_j$ during different rounds of operation.

20. The method according to claim 1 and also comprising inputting a different constant round vector to the hardware implementation of the first function $F_i$ during key expansion than during round operation.

21. The method according to claim 1 and also comprising inputting a different constant round vector to the hardware implementation of the second function $F_j$ during key expansion than during round operation.

22. The method according to claim 1 and wherein the iterated block cipher comprises a Feistel based encryption scheme.

23. The method according to claim 22, and wherein at least one of the first function $F_i$ and the second function $F_j$ comprises a portion of a combining of a round key with a "right" half.

24. The method according to claim 23 and wherein the combining occurs prior to a combining with a "left" half.

25. The method according to claim 1 and wherein the iterated block cipher comprises a substitution permutation encryption scheme.

26. The method according to claim 25, and wherein at least one of the first function $F_i$ and the second function $F_j$ comprises a portion of a round function.

27. The method according to claim 1 and wherein the first function $F_i$ is non-invertible.

28. The method according to claim 1 and wherein the first function $F_i$ is invertible.

29. The method according to claim 1 and wherein the second function $F_j$ is non-invertible.

30. The method according to claim 1 and wherein the second function $F_j$ is invertible.

31. The method according to claim 1 wherein the round key generation function generates a round key, denoted $RK_i$, for a given round, denoted $R_i$, by performing the following:
   providing a state, denoted R;
   providing a root key, denoted K, such that R comprises a result of a function InitState(K);
   providing a round number, denoted RN;
   providing a function StateUpdate( ), the function StateUpdate( ) operative to update the state of K each round after InitState(K); and
   providing a function RoundKeyGenerate( ), the function RoundKeyGenerate( ) operative to generate a round key for use during a cryptographic round, wherein $R_0$ =InitState(K); and
   for i =1 to RN:
      Ri = StateUpdate($R_{i-1}$); and
      RKi = RoundKeyGenerate($R_i$).

32. The method according to claim 31 and wherein the size of $R_i$ is equal to a size of a key.

33. The method according to claim 31 and also comprising, if RN is less than the a size of a key, initializing an L-bit state with an key of L-bits, and thereafter circularly shifting the L-bit key by one bit after each round.

34. The method according to claim 31 and wherein the first function $F_i$ comprises a non-invertible function, and the RoundKeyGenerate function further comprises the first function $F_i$.

35. The method according to claim 31 and wherein the first function $F_i$ comprises an invertible function, and the StateUpdate function further comprises the first function $F_i$.

36. The method according to claim 31 and wherein the second function $F_j$ comprises a non-invertible function, and the RoundKeyGenerate function further comprises the second function $F_j$.

37. The method according to claim 31 and wherein the second function $F_j$ comprises an invertible function, and the StateUpdate function further comprises the second function $F_j$.

38. The method according to claim 1 and wherein a pattern for utilizing the first function $F_i$ and the second function $F_j$ comprises:

| Round | Key Generation | Round Function |
|---|---|---|
| 1 | X | $F_i$ |
| 2 | $F_j$ | $F_i$ |
| 3 | $F_i$ | $F_i$ |
| 4 | $F_j$ | $F_j$ |
| 5 | $F_i$ | $F_i$ |
| ... | | | where X is either one of the first function $F_i$ and the second function $F_j$.

39. The method according to claim 1 and wherein a pattern for utilizing the first function $F_i$ and the second function $F_j$ comprises:

| Round | Key Generation | Round Function |
|---|---|---|
| 1 | X | $F_i$ |
| 2 | $F_j$ | $F_i$ |
| rounds 3 ... N – 1 | $F_j$ | $F_i$ |
| N | $F_j$ | $F_i$ |
| N + 1 | $F_j$ | $F_i$ |
| N + 2 | $F_j$ | $F_j$ |
| N + 3 | $F_i$ | $F_j$ |
| Rounds N + 4 ... N + M – 1 | $F_i$ | $F_j$ |
| N + M | $F_i$ | $F_j$ |
| N + M + 1 | $F_i$ | $F_j$ |
| N + M + 2 | $F_i$ | $F_j$ | where X is either one of the first function $F_i$ and the second function $F_j$.

40. The method according to claim 1 and wherein a pattern for utilizing the first function $F_i$ and the second function $F_j$ comprises:

| Round | Key Generation | Round Key |
|---|---|---|
| 1 | X | $F_i$ |
| 2 | $F_j$ | $F_i$ |
| 3 | $F_j$ | $F_j$ |
| 4 | $F_i$ | $F_j$ |
| 5 | $F_i$ | $F_i$ |
| 6 | $F_j$ | $F_i$ |
| 7 | $F_j$ | $F_j$ |
| 8 | $F_i$ | $F_j$ |
| 9 | $F_i$ | $F_i$ |
| ... | | | where X is either one of the first function $F_i$ and the second function $F_j$.

41. The method according to claim 38 and wherein the iterated block cipher comprises a Feistel based encryption scheme.

42. The method according to claim 38 and wherein the iterated block cipher comprises a substitution permutation encryption scheme.

43. In an iterated block cipher, a system for round key encryption and key generation, the system comprising:
   a first function $F_i$ and a second function $F_j$;
   a hardware implementation of the first function $F_i$ and a hardware implementation of the second function $F_j$;
   a round key generation function, the round key generation function being operative to utilize, in any given round, exactly one of:
      the first function $F_i$; and
      the second function $F_j$.
   a round mixing function, the round mixing function being operative to utilize, in any given round, exactly one of:
      the first function $F_i$; and
      the second function $F_j$.
   an implementation of the round key generation function, the implementation of the round key generation function being operative to utilize, in any given round, exactly one of:
      the hardware implementation of the first function $F_i$; and
      the hardware implementation of the second function $F_j$;
   an implementation of the round mixing function, the implementation of the round mixing function being operative to utilize, in any given round, exactly one of:
      the hardware implementation of the first function $F_i$; and
      the hardware implementation of the second function $F_j$;
   the implementation of the round key generation function being used in at least a first round to generate a second round key for use in a second round; and
   the implementation of the round mixing function being used in at least the first round to mix a first round key with a cipher state;
   an output comprising a temporal result of the round key generation function; and
   an output comprising a temporal result of the round mixing function,
   wherein one of the following is performed in the first round:
      the implementation of the round key generation function utilizes the hardware implementation of the first function $F_i$ to generate the second round key for use in the second round, substantially simultaneously with the implementation of the round key mixing function utilizing the hardware implementation of the second function $F_j$ to mix the first round key with the cipher state; and
      the implementation of the round key generation function utilizes the hardware implementation of the second function $F_j$ to generate the second round key for use in the second round, substantially simultaneously with the implementation of the round key mixing function utilizing the hardware implementation of the first function $F_i$ to mix the first round key with the cipher state.

* * * * *

UNITED STATES PATENT AND TRADEMARK OFFICE
CERTIFICATE OF CORRECTION

| | | |
|---|---|---|
| PATENT NO. | : 8,000,471 B2 | Page 1 of 1 |
| APPLICATION NO. | : 12/223137 | |
| DATED | : August 16, 2011 | |
| INVENTOR(S) | : Mantin et al. | |

It is certified that error appears in the above-identified patent and that said Letters Patent is hereby corrected as shown below:

In column 10, line 16 (sixth line of claim 6) delete "second function $_j$" and insert therefor --second function $F_j$ --.

Signed and Sealed this
Eighteenth Day of October, 2011

David J. Kappos
*Director of the United States Patent and Trademark Office*